United States Patent
Grove et al.

(10) Patent No.: US 7,483,414 B2
(45) Date of Patent: Jan. 27, 2009

(54) DEVICE TO TERMINATE A MODEM RELAY CHANNEL DIRECTLY TO IN IP NETWORK

(75) Inventors: Vicent T. Grove, Concord, MA (US); Herbert M. Wildfeuer, Santa Barbara, CA (US); Mehryar Khalili Garakani, Westlake Village, CA (US); Bruce D. Juhlin, Pleasanton, CA (US); Scott Anthony Boynton, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 927 days.

(21) Appl. No.: 10/144,423

(22) Filed: May 10, 2002

(65) Prior Publication Data

US 2003/0210679 A1    Nov. 13, 2003

(51) Int. Cl.
  *H04L 12/28*    (2006.01)
(52) U.S. Cl. ....................... 370/352; 370/401
(58) Field of Classification Search ............... 370/352, 370/401
  See application file for complete search history.

(56) References Cited

U.S. PATENT DOCUMENTS

| | | | |
|---|---|---|---|
| 4,965,641 A | 10/1990 | Blackwell et al. | 375/7 |
| 5,862,202 A | 1/1999 | Bashoura et al. | |
| 6,272,633 B1 | 8/2001 | Duke et al. | |
| 6,282,193 B1 | 8/2001 | Hluchyj et al. | 370/356 |
| 6,785,371 B1 * | 8/2004 | Olafsson | 379/93.35 |
| 6,788,651 B1 * | 9/2004 | Brent et al. | 370/255 |
| 6,914,899 B2 * | 7/2005 | Siegrist et al. | 370/354 |
| 6,959,005 B1 * | 10/2005 | Osler et al. | 370/445 |

(Continued)

FOREIGN PATENT DOCUMENTS

EP    0 789 470 A2    8/1997

(Continued)

OTHER PUBLICATIONS

"Procedures for real-time Group 3 facsimile communication over IP networks," ITU-T Recommendation T-38, pp. 1-30 (1998).

(Continued)

*Primary Examiner*—Edan Orgad
*Assistant Examiner*—Jay P Patel
(74) *Attorney, Agent, or Firm*—Hamilton, Brook, Smith & Reynolds, P.C.

(57) ABSTRACT

A modem data aggregating gateway that supports modem relay functionality for permitting reliable switching of modem traffic between a VoIP network and a data packet switch Internet Protocol (IP) network, s.a. the Internet. The modem relay aggregator may receive modem data encapsulated as Voice over IP (VoIP) data packets in accordance with a Simple Packet Relay Transport (SPRT) mechanism. The packet data may be error corrected and/or decompressed before being repackaged for forwarding to the ultimate destination. In the event that the destination is itself an IP device, the modem relay aggregator may forward the packets directly over the IP network. As a result, if the destination of a modem call is an IP device (such as a Web site or other Internet-enabled device) the technique eliminates two points from a processing path in which digital signal processing (DSPs) would otherwise have to perform modem protocol processing. Otherwise, minimal modem reformatting can be performed at the aggregation point.

11 Claims, 5 Drawing Sheets

U.S. PATENT DOCUMENTS

| | | | |
|---|---|---|---|
| 6,967,946 B1 * | 11/2005 | Tackin et al. | 370/352 |
| 6,986,157 B1 | 1/2006 | Fijolek et al. | |
| 7,016,475 B2 * | 3/2006 | Resuta | 379/29.02 |
| 7,072,337 B1 | 7/2006 | Arutyunor et al. | |
| 7,075,979 B2 | 7/2006 | Beadle et al. | |
| 7,133,934 B1 | 11/2006 | Rossello et al. | |
| 7,155,538 B1 | 12/2006 | Rossello et al. | |
| 7,161,931 B1 | 1/2007 | Li et al. | |
| 2002/0041591 A1 | 4/2002 | Hlluchyj | |
| 2002/0118671 A1 | 8/2002 | Staples et al. | |
| 2003/0065787 A1 | 4/2003 | Osafune et al. | |
| 2003/0123466 A1 | 7/2003 | Somekh et al. | |
| 2003/0185230 A1 | 10/2003 | Fisher et al. | |
| 2004/0190499 A1 * | 9/2004 | Chen et al. | 370/352 |
| 2004/0196833 A1 * | 10/2004 | Dahan et al. | 370/352 |
| 2006/0002539 A1 * | 1/2006 | Fang | 379/265.01 |

FOREIGN PATENT DOCUMENTS

| | | |
|---|---|---|
| EP | 1 054 569 A1 | 11/2000 |
| WO | WO 98/48542 | 10/1998 |
| WO | WO 98/58492 | 12/1998 |
| WO | WO 00/54468 | 9/2000 |
| WO | WO 01/20859 A1 | 3/2001 |
| WO | WO 01/65786 A1 | 9/2001 |
| WO | WO 01/91371 A2 | 11/2001 |
| WO | WO 01/91441 A1 | 11/2001 |
| WO | WO 01/97499 A1 | 12/2001 |

OTHER PUBLICATIONS

Somekh, Oren, "Modern Over Packet Networks Technology," Electron.Prod.Des., XP009015577, 22(11):54-58(2001).

White Paper, "Modem Over IP," Mindspeed Technologies, Apr. 2002, pp. 1-10.

M. Coffee, "Why Use Modem-over-IP?", *CommWeb*, Jul. 30, 2002, pp. 1-3, http://www.commweb.com/article/COM20020612S0002.

* cited by examiner

FIG. 1 (PRIOR ART)
VoIP Architecture

FIG 2 (PRIOR ART) MODEM RELAY

DEVICE TO TERMINATE A MODEM RELAY CHANNEL DIRECTLY TO IN IP NETWORK

BACKGROUND OF THE INVENTION

Most home computer users are now connected to a network such as the Internet in one way or another. The most popular connection technique still is to use the Public Switched Telephone Network (PSTN) and a device called a modem. As is now quite familiar to even the general population, a modem makes a connection by dialing a telephone number of an Internet Service Provider (ISP), who maintains equipment that connects to the Internet. Digital signals generated by the user's computer are converted to analog signals and vice versa by the modem such that they may be carried over the telephone lines accurately.

What is less familiar to the public at large is the configuration of the ISP equipment and how it provides connections to the Internet. ISPs such as America Online (AOL) maintain a very large number of dial-up access points. These access points permit a user to dial a local telephone number, which then connects the call to a local central office. The central office switch, which may be a so-called Class 5 switch, then directs the call to a dial termination point. The dial termination point may be located in or behind the central office, such as at a computer network Point of Presence (POP). At the POP, a device called a Remote Access Server (RAS) terminates the connection. There, Terminating Modems (TM) at the RAS are often aggregated together. In particular, the RAS contains a large number of modem devices that are used to connect to transmit and receive modem signals to and from the user Originating Modems (OM).

From the RAS, which converts signals back to digital form, the signals may be carried through a packet based network, such as an Internet Protocol (IP) network, to the Internet. In some instances, large service providers such as AOL contract with network service providers such as Genuity or UUNet to carry traffic from local central office switches to remote access server locations over high-speed digital lines.

However, other paradigms are resulting in fundamental changes in the nature of the telephone network. Most notably is the change to carry voice traffic from central offices over digital transport networks using technologies originally intended for carrying data traffic such as Internet Protocol (IP). So-called Voice-over IP (VoIP) packet networks are envisioned to be the architecture of choice of the future for voice transport.

Figure 1:
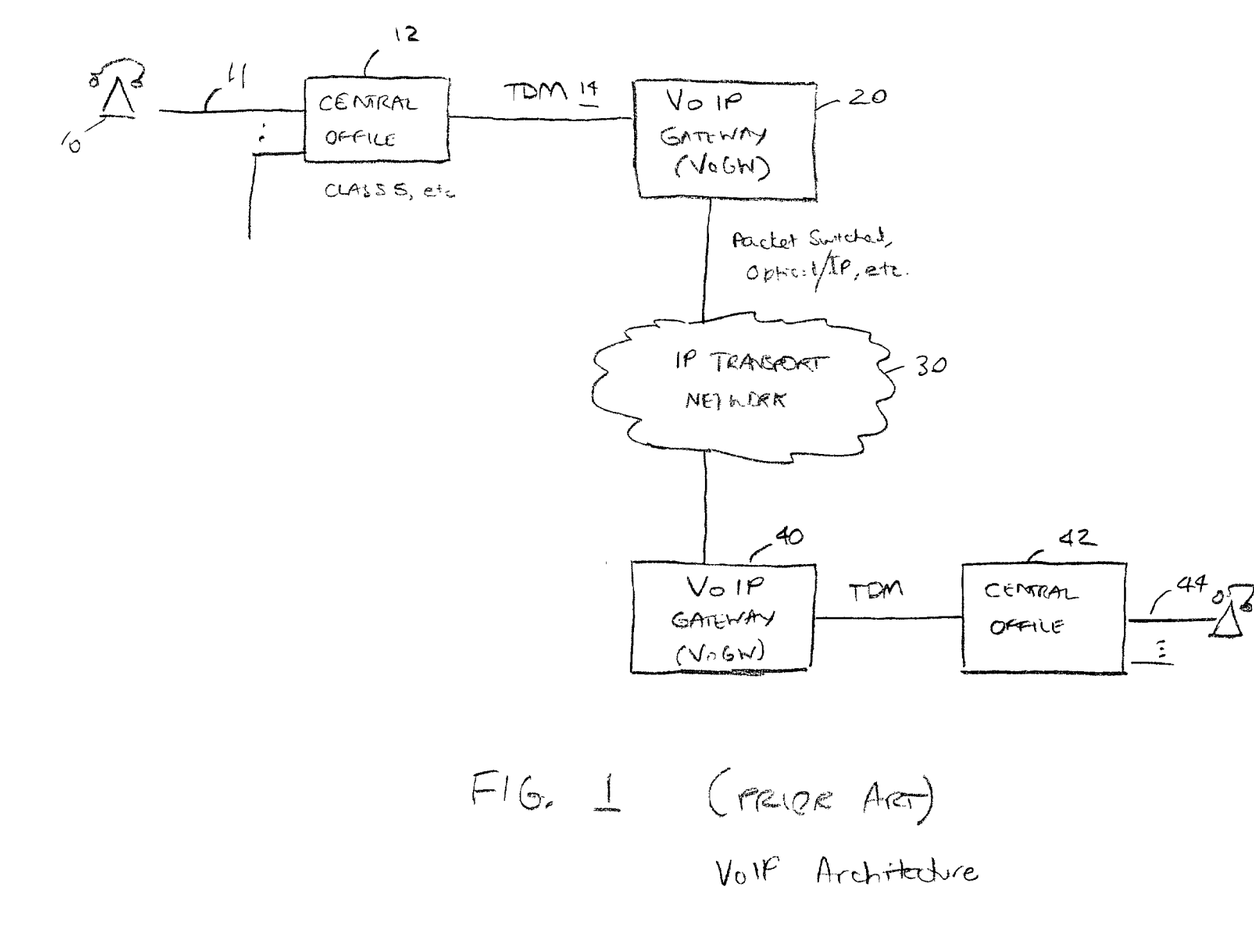
FIG. 1 is a block diagram of a prior art telecommunications network for handling modem traffic.

In this architecture, shown at a high level in FIG. 1, a Central Office (CO) 12 can aggregate multiple Plain Old Telephone Service (POTS) type voice connections 10, multiplexing them into a digital Time Division Multiplex (TDM) transport 14 format such as T1 or E1 carriers. This permits the use of digital technologies to transport voice signals to a transit location in which is installed a Voice over Internet Protocol Gateway (VoIP GW) 20. The VoIP GW converts the TDM signals to a packet switched transport format, forwarding them to an IP network 30. At the other side of the IP network, a second VoIP GW 40 receives the signals, converts them back to TDM format, and forwards them to a far end Central Office (CO) 42 which then further forwards signal to individual far end POTS connections 44.

As telecom networks migrate to a VoIP architecture, it becomes important to support various types of calls that a user wishes to make over the TDM network. At present, there are standards for carrying voice, touchtone (Dual-Tone, Multi-Frequency (DTMF)) dialed digits, and fax signaling over IP connections. While there remains an effort to develop standards for carrying modem traffic over TDM connections, there is no standard yet adopted to date for reliable transport of modem signals over IP connections.

Figure 2:
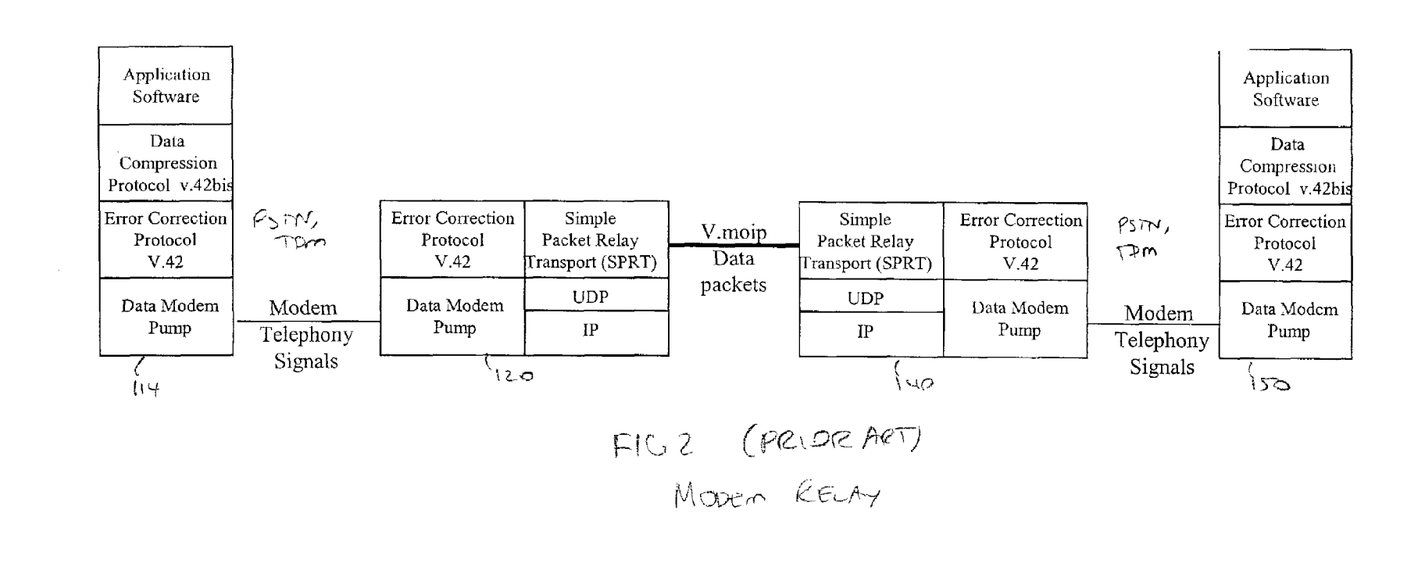
FIG. 2 is a block diagram of a prior art modem relay architecture.

One effort towards solving this problem is so-called modem relay transport. Modem relay is being considered by the International Telecommunications Union (ITU) and Internet Engineering Task Force (IETF), with an aggressive schedule to ratify standards in the near future. The basic idea behind this architecture is to insert a "modem relay" capability into the VoIP GW. Such an architecture is shown in FIG. 2. Here the dial modem 14 acts as an origin point for a call to a destination point which may be an Internet Service Provider (ISP) 60. The modem call is first typically forwarded to a Class 5 or other central office switch in the standard fashion over a circuit switched PSTN 18. The Class 5 switch (not shown in FIG. 2) connects the call through the PSTN 18 to an Originating Voice Gateway (OGW) 20 which supports modem relay.

The OGW 20 implements some amount of modem intelligence so as to enable modem traffic to be carried over an IP network 20 to a Terminating Gateway (TGW) 40. This may consist, for example, of (de)modulating the modem data (e.g., per the CCITT V.90, V.34, V.32, or V.22 standards), error correction processing (e.g., per V.42 or V.44), and encapsulating the resulting data modem as a Simple Packet Relay Transport (SPRT) packet.

The TGW 40 receives this "Modem over IP" (MoIP) formatted packet and then converts it back to a TDM format so that it can be transported over another PSTN 44 connection to a Remote Access Server (RAS) 50. This involves stripping off the SPRT formatting, performing error correction V.42 and data modulation protocol (V.90, V.34, V.32, V.22) etc. formatting. From the Remote Access Server, the packet is then passed over a pure TDM network 44 to the ISP 60. Here, the data is (de)modulated and error corrected by the terminating modem (RAS).

In this modem relay architecture, both the OGW 20 and the TGW 40 must include some amount of modem intelligence in order to permit proper transport of the modem signals over the IP network. In particular, they should perform basic portions of a modem protocol stack processing, as shown. A Digital Signal Processor (DSP) located in each of the gateways 20 and 40 and at the RAS 50 performs the required protocol translations. At the lowest layer of the protocol stack, this includes a physical layer performing modulation/ demodulation or data "modem pump" functions in accordance with modem standards (V.90, V.34, V.32, V.22, and the like). The modem enabled gateways 20 and 40 also perform secondary physical layer functions such as error detection and error correction as specified by V.42 or V.44, for example.

The gateways 20 and 40 also perform tasks associated with network layer tasks. These may, for example, consist of layering a Simple Packet Relay Transport (SPRT) over UDP to format data signals so that they may be properly transported over the IP network 30. Note that the SPRT packets are still compressed (per V.42bis or V.44) when so forwarded.

SUMMARY OF THE INVENTION

Basically, the present invention comes about from realizing that one can eliminate one of the PSTN legs of the modem relay call and consequently eliminate a large part of the modem process. Consider that only certain portions of the physical layer modem processing need be performed by the Terminating Gateway (TGW) in order to make the signals compatible for transport over the Internet. Specifically, at an originating point, the users' data is formatted as modem signals and transported to an Originating Gateway (OGW), as with prior art modem relay operations. However, we have noted that the modem signals are already formatted as digital data when they arrive at the Terminating Gateway. Thus, the final PSTN leg can be eliminated, and modem modulation/demodulation signal processing need not be performed at all. The Terminating Gateway (TGW) can therefore simply forward packets to the destination IP network, and with a small amount of processing, can replace the other modem relay functions associated with prior art TGWs & RAS With this architecture, a new device called a Modem Relay Aggregator is used. The OGW functions as it does in a Modem Relay (MR) call, forwarding the MoIP packets to a TGW location. However, the Modem Relay Aggregator (MRA) replaces the functionality of both the Terminating Gateway and the RAS, performing decompression and any application layer processing required, such as PPP termination.

The MRA therefore replaces the Terminating Gateway, and communicates directly with destination IP devices. This technique provides a much simpler termination for a modem relay solution.

As a result, an MRA provides a reliable transport for modem traffic across a packet network. It avoids demodulating the modem signal for delivery to the PSTN side of the interface, and then simply sends the encapsulated data to the packet network, eliminating the final PSTN leg. , the other system components do not have to complete the aspects of traditional Modem Relay call processing.

Using the invention, Internet Service Providers (ISPs) can terminate subscribers' modem sessions transported over a VoIP network using MR. The voice gateway at the originating site need only be modified as long as it supports Modem Relay capabilities such as physical layer processing for the modem signals, error detection, and error correction.

Several other advantages occur as a result. For example, if the destination of a modem call is an IP device such as a web site, this technique eliminates the need to implement Digital Signal Processing (DSP) to modulate or demodulate signals in at least two locations (namely the TGW and the RAS). This creates the opportunity for more efficient network architectures.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A description of a preferred embodiment of the invention follows.

Figure 3:
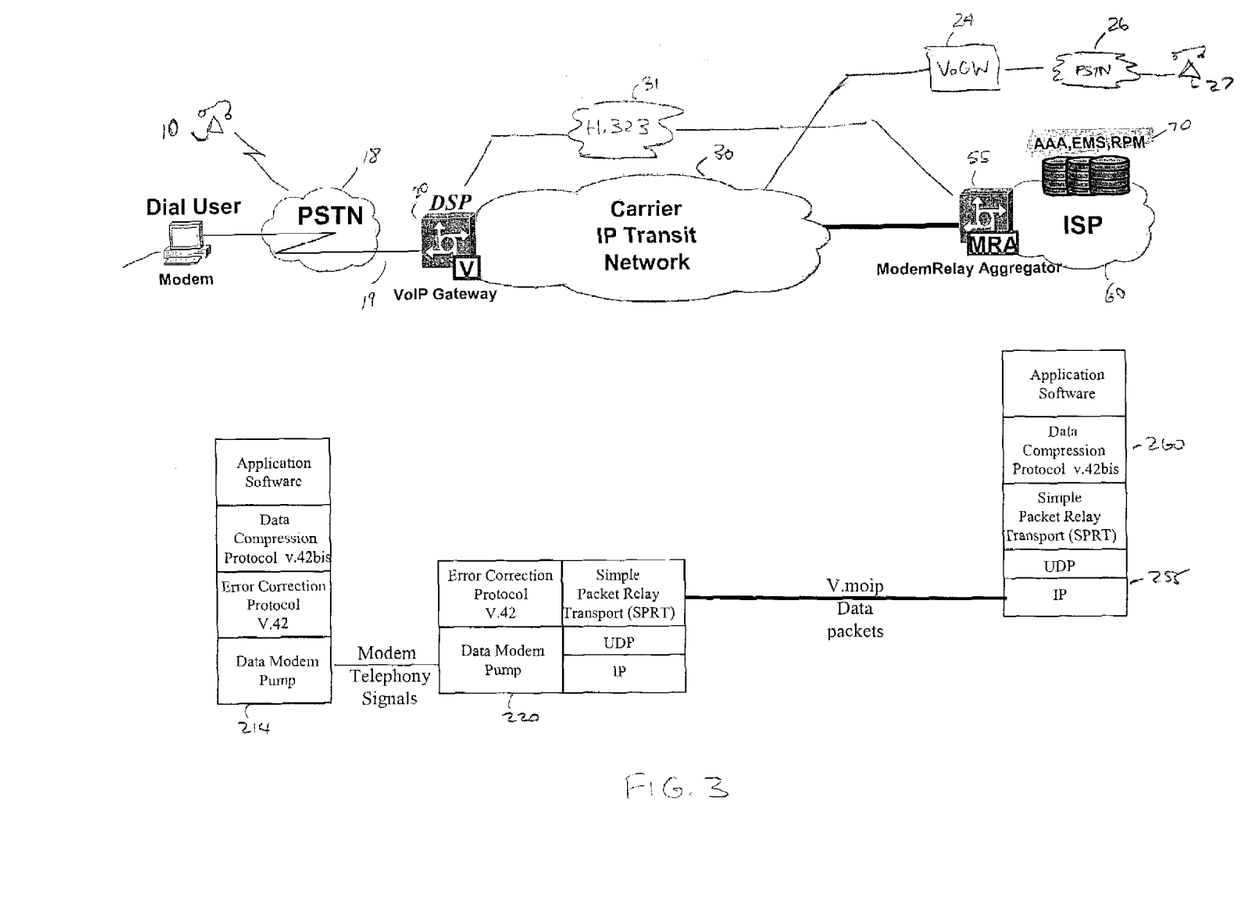
FIG. 3 is a diagram of a modem relay aggregator architecture in accordance with the present invention.

FIG. 3 is a block diagram of a telecommunications network that implements modem relay in a Voice over Internet Protocol (VoIP) network. In such a network, a customer has a telephone that receives and places voice calls to and from another telephone 27. Voice signals are caused to travel over a Public Switched Telephone Network (PSTN) 18 through one or more local central offices (not shown). The central offices include switching equipment such as a Class 5 (C5) switch to aggregate such calls onto a digital Time Division Multiplex (TDM) carrier such as a T1 carrier signal, in a manner that is well known in the art.

According to well known telephone VoIP voice call control signaling techniques, a voice call is set up by providing a connection through a transport network, such as a Time Division Multiplex (TDM) transport network 19, to an Originating VoIP Gateway 20. The Voice over IP (VoIP) Gateway (VoIP GW) is typically used for carrying voice traffic. In this instance, the TDM voice signals are converted to packet format so that they may be carried over IP network 30 to a Terminating Gateway 24. The Terminating Gateway 24 in turn converts the modem signals to a TDM format (PCM) to be transported to a distant Central Office via the PSTN 26. This in turn provides a connection to the destination telephone 27. Voice traffic may thus be carried in this way over the IP network 30 in a manner that is well known in the art.

The present invention is related to the transmission of modem signals through the VoIP network or so-called Modem over IP (MoIP) transmission. Computer modem signals originating at a customer modem 14, for example, by being fed through the carrier IP transit network 30 through a modem relay aggregator 55 to reach Internet connections available such as, for example, through an Internet Service Provider (ISP) 60. The ISP 60 in turn provides connections to computer networks 70 such as the Internet, to obtain data, view World Wide Web sites, and the like.

In accordance with the invention, the terminating gateway device (in this instance, the Modem Relay Aggregator (MRA) 55) requires no conversion to Time Division Multiplex (TDM) format for transport over a second PSTN connection as in the case with the prior art modem relay architecture of FIG. 2. Rather, the present invention takes advantage of implementing modem relay functionality and Internet gateway functionality in the same device. The MRA 55 is thus a new category of telecom device that sits at the destination end of the carrier IP transit network 30. Here, the MRA 55 completes termination of the modem protocol stack and acts as a gateway to the Internet 70 without the need to traverse the PSTN a second time.

At the time the modem call is set up, control signaling recognizes the call as a modem call and makes the call destination a modem-relay-aggregator (MRA) enabled VoIP GW 20 rather than a Remote Access Server (RAS) (as in the case with the prior art modem relay network shown in FIG. 2). In practice, modem functionality 220 is supported in the OGW, specifically the ability to perform physical layer modulation/demodulation processing (data modem pump). Thus, when modem signals are received from the customer modem 14 at the Originating Gateway (OGW) 20, only a demodulation function is performed. Likewise, signals to be sent to the customer modem 14 originating from the IP network 30 are remodulated and sent over the TDM network 19. However, that is all the processing that the OGW 20 must perform.

The OGW 20 thus makes a call to a Modem Relay Aggregator 55, setting up a connection through the IP network 30. The connection may be made through standardized call control signaling (e.g., via an H.323 network 31) in a manner that is well known in the art. After opening the call connection to the MRA 55, the modem data can then be transported over the IP network 30 in compressed form, arriving at the MRA 55.

Other than demodulating the modem signal and performing error detection and correction, the OGW 20 does not need to complete the remaining aspects of traditional modem termination. For example, decompression and PPP or other transport layer protocols need not be provided by the modem functionality 40 in the Originating Gateway 20. The IP network 30 then carries the compressed and still frame formatted data over the IP network 30 to the MRA 55. It should be noted that a single MRA 55 can perform modem traffic aggregation for a number of different connections.

The destination IP device 70 may be any IP enabled device such as an Internet gateway, router, IP switch, or other internetworking device that is IP addressable.

The Modem Relay Aggregator (MRA) 55 may typically perform a number of functions once in a modem relay state. For example, after negotiating an MR session with the OGW 20, the MRA 55 can remove the IP-like encapsulation implemented by a Simple Packet Relay Transport protocol (SPRT) added at the Originating Gateway (OGW) 20. In a next step, the data is decompressed and any application layer processing, such as PPP processing, may be performed, if needed.

The resulting new IP packet having a destination address for the IP device 70 may then be created. Once this is complete, the MRA 55 may then forward the packet over the packet switched network such as represented by the ISP 60 where it is routed to the destination device 70.

Figure 4:
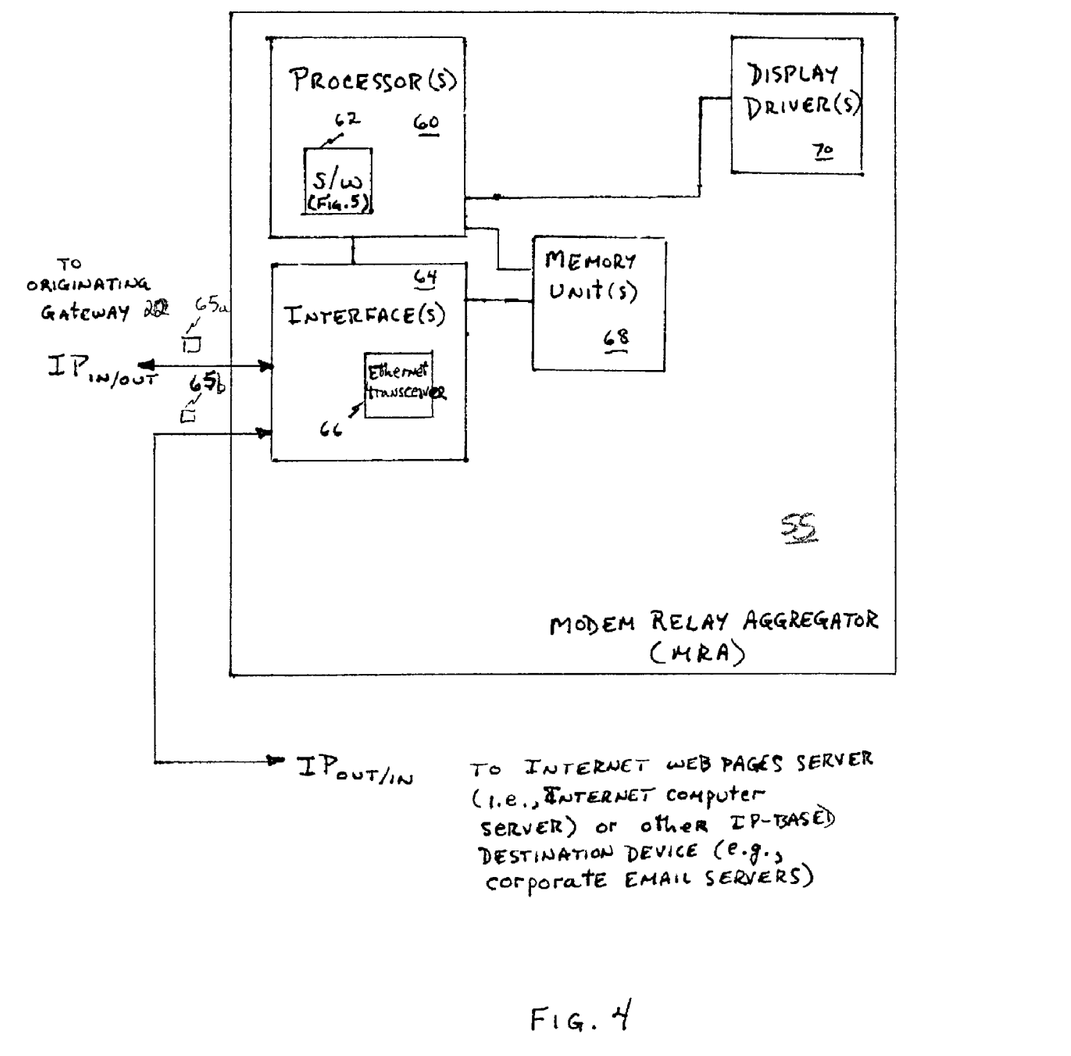
FIG. 4 is a more detailed diagram of a Modem Relay Aggregator (MRA).

FIG. 4 is a generalized block diagram of one embodiment of the MRA 55. The MRA 55 includes at least one processor 60 executing software 62, at least one interface 64 connected to the processor(s) 60, at least one memory unit 68 connected to the interface(s) 64 and processor(s) 60, and a display driver 70 connected to the processor(s) 60. The interface(s) 64 include a code 66, which is used to support physical layer communications.

The interface(s) 64 input/output IP packets 65*a* to and from the originating gateway 22. The interface(s) 64 also communicate IP packets 65*b* to and from a local or remote computer (not shown).

The software 62 executed by the processors 60 provides processing for the IP packets 65*a*, 65*b* in both the forward and reverse directions (i.e., from the originating gateway 22 to an end node computer or vice versa). The software effectively provides the functionality of the terminating gateway and remote access server of the prior art. Thus, the MRA 55 does not need to include a digital signal processor (DSP) to perform its operations since the Layer 1 modulation/demodulation processing need not be done in the MRA 55. A flow diagram of the generalized software is shown in FIG. 5.

Figure 5:
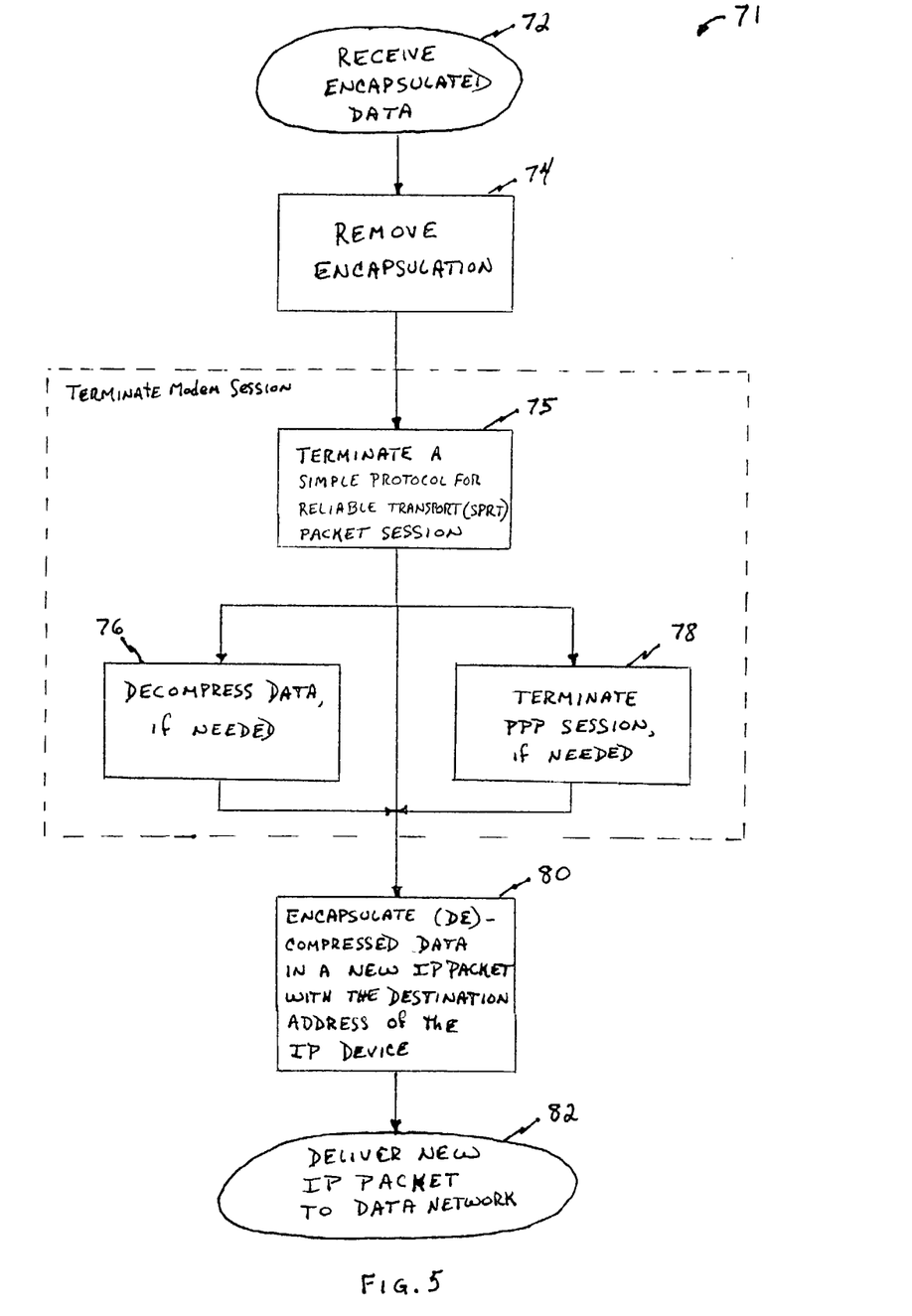
FIG. 5 is a flow chart of the operations performed by the MRA.

Referring to FIG. 5, the MRA 55 executes a process 71, which is part of the software 62 (FIG. 4), when receiving IP packets 65*a* from the originating gateway 22 in the form of encapsulated data (Step 72) in a PPP session. The process 71 removes the encapsulation (Step 74) and decompresses the data, if needed (Step 76). The process 71 terminates the PPP session (Step 78) in a manner commonly known in the art. Once all the data is collected, the process 71 encapsulates the compressed or uncompressed data in a new IP packet with the destination address of the end node IP device (Step 80). The process 71 ends when the data in the new IP packets have been delivered to the data network for receipt by the end node IP device.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for forwarding modem signals through a transport network from an originating modem to a destination point comprising:

at an originating gateway communicating with a Modem Relay Aggregator (MRA) that is located at a point in an Internet Protocol (IP) network that is remote from the originating gateway:

receiving modem telephony signals from a circuit switched telephony network;

removing modem telephony protocol information from the modem telephony signals;

encapsulating resulting data in a transport protocol packet for use by the MRA to terminate a modem relay session;

forwarding the encapsulated packets over a Voice over Internet Protocol (VoIP) packet switched data network connection in the IP Network;

at the MRA located at a point in the IP network that is remote from the originating gateway:

terminating a modem relay session using the encapsulated data in the transport protocol packet; and forwarding resulting data packets through a packet data network gateway to the destination point.

2. A method as in claim 1 wherein the transport protocol is a Simple Packet Relay Transport (SPRT).

3. A method as in claim 1 wherein the modem telephony protocol information includes error correction protocol information.

4. A method as in claim 1 wherein the modem telephony protocol information includes data compression information.

5. A method as in claim 1 encapsulating resulting data, using the MRA, in a transport protocol packet occurs at the modem relay signal aggregation point.

6. A computer readable storage modem containing instructions readable by a computer to configure the computer to perform a method for forwarding modem signals through a transport network from an originating modem to a destination point comprising:

at an originating gateway to communicate with a Modem Relay Aggregator (MRA) that is located at a point in an Internet Protocol (IP) network that is remote from the originating:

receiving modem telephony signals from a circuit switched telephony network;

removing modem telephony protocol information from the modem telephony signal;

encapsulating resulting data in a transport protocol packet for use by the MRA to terminate a modem relay session;

forwarding the capsulated packets over a Voice over Internet Protocol (VoIP) data network connection in the IP Network;

at the MRA located at a point in the IP network that is remote from the originating gateway, removing the transport protocol signaling from the capsulated packets; and forwarding said resulting data packets over a second data network connection.

7. An apparatus for forwarding modem signals through a transport network from an originating modem to a destination point comprising:

an originating gateway, to communicate with a Modem Relay Aggregator (MRA) that is located at a point in an Internet Protocol (IP) network that is remote from the originating gateway, that itself comprises:

means for receiving modem telephony signals from a circuit switched telephony network;

means for removing modem telephony protocol information from the modem telephony signals;

means for encapsulating a resulting data in a transport protocol packet for use by the MRA to terminate a modem relay session;

means for forwarding the encapsulated over a Voice over Internet Protocol (VoIP) packet switched data network connection in the IP Network; and the MRA located at a point in the IP network that is remote from the originating gateway means, including:

means for terminating a modem relay session using the encapsulated data in the transport protocol packet; and means for forwarding resulting data packets through a packet data network gateway to the destination point.

8. An apparatus as in claim 7 wherein the transport protocol is a Simple Packet Relay Transport (SPRT).

9. An apparatus as in claim 7 wherein the modem protocol information includes error correction protocol information.

10. An apparatus as in claim 7 wherein the modem protocol information includes data compression information.

11. An apparatus as in claim 7 wherein means for encapsulating a resulting data in, using the MRA, a transport protocol packet occurs at the modem relay signal aggregation point.

* * * * *

UNITED STATES PATENT AND TRADEMARK OFFICE
CERTIFICATE OF CORRECTION

| | | |
|---|---|---|
| PATENT NO. | : 7,483,414 B2 | Page 1 of 1 |
| APPLICATION NO. | : 10/144423 | |
| DATED | : January 27, 2009 | |
| INVENTOR(S) | : Grove et al. | |

It is certified that error appears in the above-identified patent and that said Letters Patent is hereby corrected as shown below:

On the Title page, Item (75), replace "Vicent T. Grove" with -- Vincent T. Grove --.

Signed and Sealed this
First Day of May, 2012

David J. Kappos
*Director of the United States Patent and Trademark Office*